May 10, 1932.     W. G. SHELTON     1,857,982
VIBRATOR OR LIKE MECHANISM
Filed Feb. 20, 1929
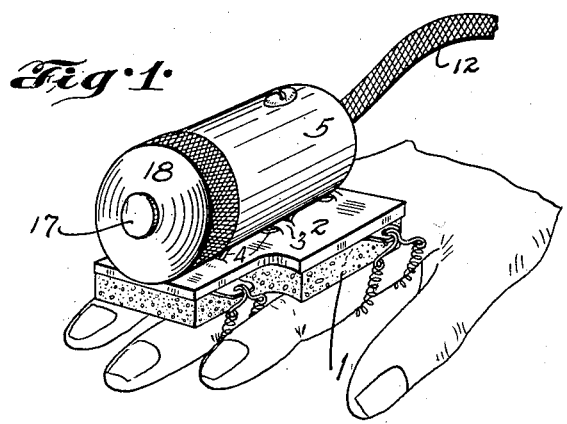
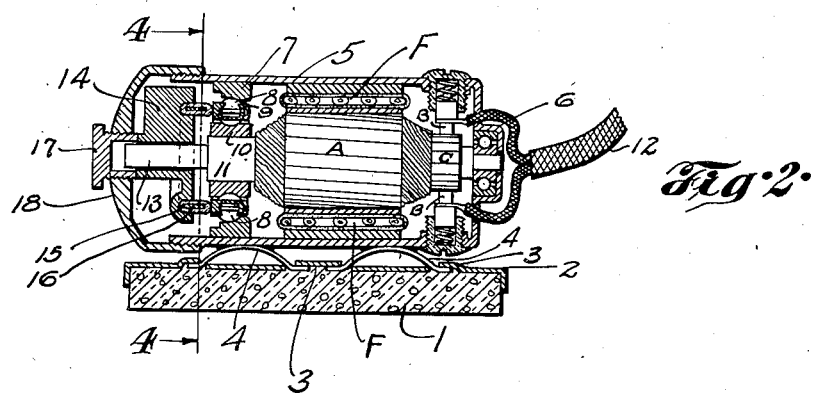
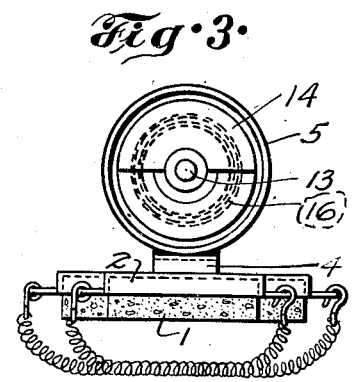
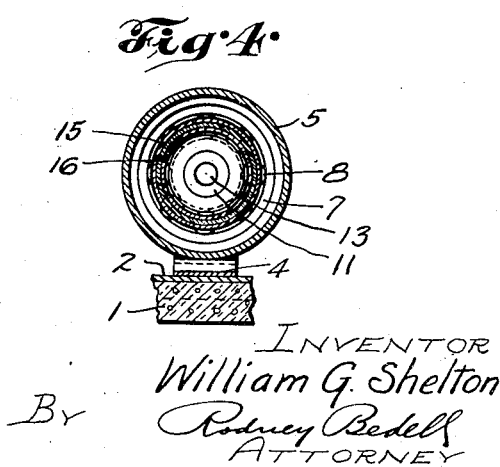
INVENTOR
William G. Shelton
By Rodney Bedell
ATTORNEY Patented May 10, 1932

1,857,982

UNITED STATES PATENT OFFICE

WILLIAM G. SHELTON, OF ST. LOUIS, MISSOURI

VIBRATOR OR LIKE MECHANISM

Application filed February 20, 1929. Serial No. 341,476.

My invention relates to driving mechanisms particularly adapted for vibrators such as are used by masseurs and consists in novel mounting and connection of a motor and a weight or other member rotated by the motor about an axis.

The main object of my invention is to provide a simple, efficient and economical structure for the intended purpose.

More detailed objects of my invention are to construct the apparatus in a very small form, to utilize an anti-friction device as part of the motor mounting and, preferably, to operate a driven member, such as an eccentrically disposed weight, by a portion of the anti-friction device, utilizing the device as a reduction gearing between the motor and the member.

In the accompanying drawings illustrating a selected embodiment of my invention—

Figure 1 is a perspective view of the complete device in use attached to the hand of an operator.

Figure 2 is a vertical longitudinal section through the device.

Figure 3 is an end view of the device looking towards the lefthand end of the structure shown in Figure 2 with the end cap removed.

Figure 4 is a transverse vertical section taken on the line 4—4 of Figure 2.

The pad 1 forms a base for the machine and may be formed of felt or other similar material to which a rigid backing 2 is applied provided with suitable displaced elements 3 adapted to receive the ends of springs 4 which form a yielding mounting on base 1 for the housing 5 which constitutes the body of the apparatus.

The lefthand end of the housing 5 provides a cup 6 in which is mounted a ball-bearing unit comprising an outer race and inner race and a series of balls spacing said races from each other and mounting the inner race. Near the other end of the housing is a larger ball-bearing unit comprising an outer race 7, ball-bearings 8 separated by a spacer 9 and supporting an inner race 10.

The inner races of the two ball-bearing units mount the opposite journals of the shaft 11 of the motor armature A rotating between the fields F carried by the housing 5. A usual commutator C is provided on the righthand portion of shaft 11 and is provided with suitable brushes B to which current is supplied through the conduit 12.

The lefthand end of shaft 11 preferably terminates in a spindle 13 which journals a weight 14 disposed eccentrically about the axis of the motor shaft. A friction member 15 is carried by weight 14 and is shown as comprising a flat rubber ring having a stiffener 16. This member 15 has frictional contact with the spacer 9 of the anti-friction device and will be rotated by the spacer subject to any slippage which occurs between member 15 and the spacer.

The amount of such slippage may be governed by means of a nut 17 threaded into the cap 18 which encloses the end of the motor housing. Screwing nut 17 inwardly will move weight 14 to the right and thrust member 15—16 more tightly against the annular face of spacer 9.

It is obvious that the rotation of the weight about the motor shaft gives an oscillating effect which is transmitted through the bearings directly to the housing 5 and through the latter and springs 4 to the base 1.

It will be understood that roller bearings may be substituted for the ball-bearings illustrated and that in the broadest form of my invention it is not essential that the motor be provided with anti-friction bearings as other means for mounting the motor may be provided.

The driving of the weight by the spacer for the anti-friction bearings is preferred, however, as this provides for rotating the weight at less speed than the motor shaft, the ball-bearing and the spacer forming, in effect, a reduction gearing for the yoke 13, the friction ring 15 adding a further reduction element in this respect.

While the construction described is especially designed for small hand vibrators, it is obvious that the driving mechanism may be used for other vibrators having similar limitations of size and weight. I contemplate the exclusive use of the subject matter of my claims, irrespective of the use to which the particular device may be placed.

It will be understood that my invention is designed primarily for use with relatively light weight motors having a speed, for example, of twenty thousand revolutions per minute and intended to operate a driven member at a speed of something less than eight or ten thousand revolutions per minute. In small devices, ordinary reduction gearing would be impractical and expensive, particularly as the ratio between the motor shaft and the driven member is increased. Furthermore, it would be difficult and expensive to provide ordinary variable gearing in such devices. My construction provides a simple and efficient solution of the difficulties presented in this type of drive.

Variations in the details of the structure other than those referred to above may be made without departing from the spirit of my invention and I contemplate the exclusive use of such modifications as may be suggested by the commercial development of my device.

I claim:

1. In a vibrator, a motor, a shaft rotatable by said motor, an anti-friction bearing device for supporting said shaft and including an inner race mounted on said shaft and anti-friction elements on said race and a spacer for said elements, an unbalanced weighted wheel freely rotatable on said shaft, and a member providing a yielding operative connection between said spacer and the outer portion of said wheel for rotating the latter.

2. In a vibrator, a motor, a shaft rotatable by said motor, an anti-friction bearing device for supporting said shaft and including an inner race mounted on said shaft and anti-friction elements on said race and a spacer for said elements, an unsymmetrically weighted wheel rotatably mounted on said shaft, a member providing frictional contact between said spacer and weighted wheel for rotating the latter, and means for varying the degree of frictional contact between said spacer and said wheel to vary the speed of rotation of said weight.

3. In a hand massage vibrator, a housing, a motor in said housing and including a rotating shaft, an anti-friction device mounted in said housing and providing a bearing for said shaft, said device including a member in rotatable engagement with said shaft, and an unsymmetrically weighted wheel in yielding engagement with said member and freely rotatable about said shaft.

4. In a vibrator, a housing, a motor in said housing and including a rotating shaft, an anti-friction device mounted in said housing and providing a bearing for said shaft, said device including an element in rotatable engagement with said shaft, an unsymmetrically weighted wheel rotatably mounted on said shaft, means for adjusting said weighted wheel longitudinally of said axis, and frictional material between the inner face of said wheel and said element.

5. In a vibrator, a motor frame, a motor mounted therein, and including a shaft, a cap on the end of said frame, an unbalanced weighted wheel behind said cap freely rotatable about said shaft, a yielding driving connection between said weight and shaft, and means extending through said cap adapted to apply variable pressure to said wheel longitudinally of said shaft to vary the speed of rotation of said wheel.

6. In a hand massage vibrator, a base, a motor armature including a shaft, an unbalanced weighted wheel rotatably mounted on said shaft, and an anti-friction bearing device forming a support for said shaft and having an element yieldingly engaging said wheel whereby said device forms a reduction gearing for driving said wheel from said shaft.

7. In a hand massage vibrator, a base, a motor armature including a shaft, an unbalanced weighted wheel rotatably mounted on said shaft, and an anti-friction bearing device having relatively movable elements engaging said shaft and said wheel to form a reduction gearing between the same and means for adjusting the engagement of said bearing device with said wheel for varying the speed of said wheel.

8. In a hand massage vibrator, a base, a motor armature including a shaft, an unbalanced weighted wheel rotatably mounted on said shaft and having a friction element, and an anti-friction bearing device with relatively moving members engaging said shaft and said element and forming a bearing for said shaft and a reduction gearing between the same and said wheel.

9. In a vibrator, a housing, a motor therein including a shaft, an anti-friction bearing in said housing for journalling said shaft and including a ring like spacer element rotatable with said shaft, an unbalanced weighted wheel rotatable about said shaft, a circular friction member between said ring element and said wheel and secured to said wheel, and a device adjustably mounted on said housing for moving said wheel and friction member towards said ring like spacer to vary the pressure between said spacer and said member to vary the speed of rotation of said wheel.

10. In a vibrator, a housing, an anti-friction bearing device mounted therein and including ball or roller bearings and a rotatable ring like spacer, a motor having a shaft journalled in said bearing and extending beyond the same, an unbalanced weighted wheel journalled on said shaft, a circular friction member between said wheel and spacer and adapted to frictionally engage the spacer, and a nut threaded into the end of said housing and engaging said wheel to move the same and said friction member against said spacer to vary the speed of rotation of said wheel by varying the degree of slippage between said wheel and said shaft.

In testimony whereof I hereunto affix my signature this 16th day of February, 1929.

WILLIAM G. SHELTON.